G. BAEHR.
VEHICLE TOP.
APPLICATION FILED FEB. 26, 1920.
1,419,799.
Patented June 13, 1922.
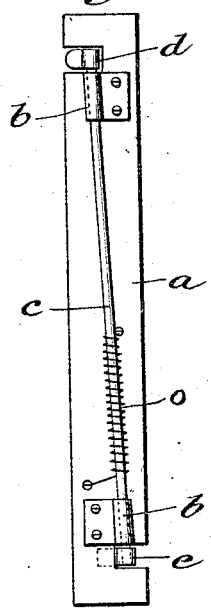
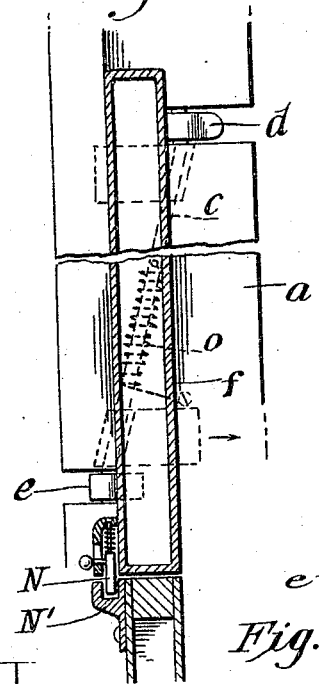
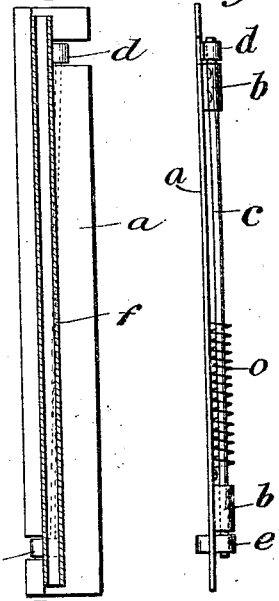
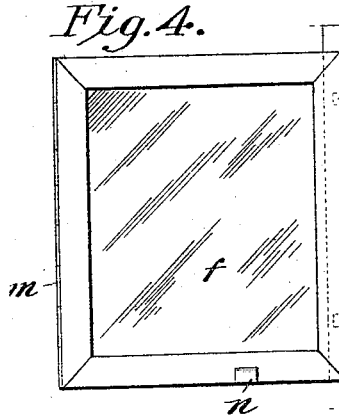
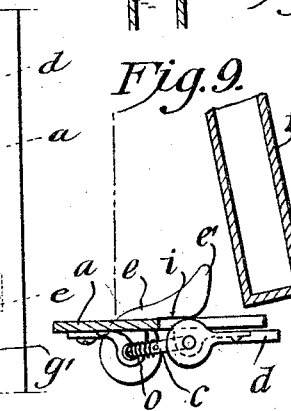
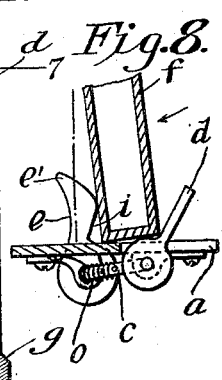
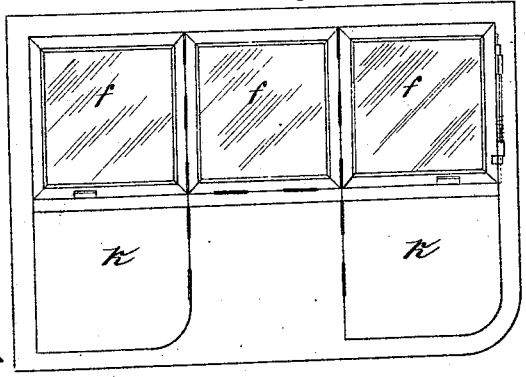
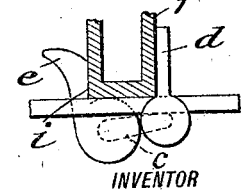
WITNESSES
INVENTOR
Gustave Baehr:
BY
ATTORNEYS

UNITED STATES PATENT OFFICE.

GUSTAVE BAEHR, OF PARIS, FRANCE.

VEHICLE TOP.

1,419,799. Specification of Letters Patent. Patented June 13, 1922.

Application filed February 26, 1920. Serial No. 361,397.

*To all whom it may concern:*

Be it known that I, GUSTAVE BAEHR, a citizen of France, and a resident of Paris, France, have invented a new and Improved Vehicle Top, of which the following is a full, clear, and exact description.

This invention relates to automobile or other vehicle bodies and has particular reference to means or devices for fastening automatically movable frames, glazed or otherwise, for the construction of automobile or other carriage bodies.

In certain automobile constructions now in use there is an arrangement for converting an open automobile body into a closed automobile body. The arrangement comprises in general a closure which when in use is fitted between the body proper and the roof and which consists of three panels of glass arranged in suitable frames hingedly connected to each other whereby when not in use the panels may be folded upon each other and housed within the body of the automobile. When in use the panels rest on the rim of the body proper and extend from this rim to the top, a catch or spring bolt being carried by the frames and coacting with the body proper to secure the panels in position when the automobile has been converted to the closed body type of vehicle. It has been found however that the catch does not serve to prevent vibration or chattering of the glass panels and when permitted to so vibrate the glass panels are sometimes subjected to such severe shocks as to cause them to be broken.

One of the principal objects of the present invention is to provide means in conjunction with a construction of this character which prevents the vibration or chattering of the glass panels thus relieving them of shocks and preventing their breakage as well as enhancing the comfortable and agreeable features of pleasure cars or automobiles.

In the annexed drawings which are given as an example of a working form of my invention as applied to an automobile carriage which carriage can be transformed into an open or into a closed body as desired.

Figs. 1, 2 and 3 are respectively a rear view, a side view, and a front view of the arrangement intended to be placed in the frame of the door.

Figs. 4 and 5 are respectively a front view and a vertical section of the arrangement in its place on the door and in a closing position.

Fig. 6 shows the arrangement diagrammatically applied to the body.

Fig. 7 is a section on a larger scale on the line 7—7 of Fig. 5.

Figures 8 and 9 are diagrammatic views in horizontal section, illustrating the action of the lock lugs and associated mechanism when the panels are being swung to position to convert the automobile to the closed type of vehicle; and Figure 10 is a view in vertical section, illustrating the action of the invention in conjunction with the spring bolt or catch now in use.

The arrangement has a supporting plate $a$ intended to be fixed to the interior vertical beam of the door against the slit which has to receive the movable glass plate. On the plate $a$ is placed on bearings $b$ a shaft $c$ having at its upper and lower ends catches or locking lugs $d$ and $e$ placed in different vertical planes so that the distance of its spaces in horizontal projection is equal to the thickness of the frame $f$. (Figs. 3 and 7). To obtain this result this shaft $c$ which supports these catches has an inclined position which is clearly shown in Fig. 1. In mounting, the plate $a$ is so fixed that it is just flush with the rim $g'$, Fig. 4, of the vertical bar $g$ of the door, while in the thickness of this beam the shaft $c$ is placed. When not in use the face $i$ of the lower catch $e$ is placed against the support plate $a$, the rounded jaw of this catch extending above the plate as can be seen in Figs. 2 and 8. The upper catch $d$ has a position parallel to the face $i$ of the catch $e$ and consequently parallel to the plate $a$ and to the rim of the beam of the door, and as these catches are separated in vertical projection at a distance equal to the thickness of the glass plate $f$ this catch $d$ is quite at the inner side of the plate $a$. If the carriage is transformed to a closed carriage by placing a glass plate $f$ on each door $k$, Fig. 6, each of these glass plates is caused to pivot around its hinge $m$, (Fig. 4) to bring it on the top of the door on which this frame is held by a spring bolt $n$ and locking keeper $n'$. The rim of the frame engages the rounded jaw or operating toe $e'$ of the lower catch $e$ makes it pivot so far that it brings the inside face $i$ of the catch just inside the interior rim of the slot, the jaw of this catch $e$ placing itself in an aperture of this slit, this aperture not being shown in the drawing. The catch $e$ in pivoting causes a partial rotation of the shaft $c$ and consequently of the upper catch $d$ which has the position as shown in Figs. 3, 4, 5 and 7, being affixed to the interior edge of the window frame $f$, and holding in this way this frame at its upper end. The catch or lock lug $e$ thus constitutes a combined operating and locking lug.

To form an open carriage the frame or window $f$ is caused to pivot on its hinge $m$ after the spring bolt $n$ is released. In this movement or pivoting of the window the catch $d$ takes again the position of Fig. 2, in bringing the lower catch into the position of Fig. 2 and being ready again to receive the action of the glass frame.

In order to avoid all movement in this arrangement there has been fixed a spiral spring $o$, Figs. 1 and 2, around the shaft $c$ resting on the plate $a$ and with the object of bringing the face $i$ of the catch $e$ constantly in contact with the plate $a$. The form of the parts can of course vary according to the different particular applications for which they are intended. The shaft $c$ could have a vertical direction and place one of the catches $d$ or $e$ obliquely. On this shaft $c$ could be fixed two or more catches $d$ divided over the height of the slit or a band could be fixed holding partly or wholly the height of the frame $f$. The invention can be applied to vehicles of any kind and generally in all cases where a movable surface must be made well connected to the fixed body.

The action of the lock lugs and the associated mechanism during the conversion of the vehicle from an open to a closed type is well illustrated in Figures 8, 9 and 7. In Figure 8 it will be seen that as the frame $f$ swings to closed position it engages the toe $e'$ of the lug $e$ and rotates the lock lug as indicated in Figure 9. This rotation of the lock lug $e$ also rotates the shaft $c$ and consequently the lock lug $d$ which is fixed to the shaft. This action continues until the parts assume the position shown in Figure 7, with the flat surface $i$ of the locking lug $e$ engaging one side of the frame $f$ and the locking lug $d$ engaging the other side of the frame $f$. In this position the spring bolt $n$ is received in its keeper $n'$ as indicated in Figure 10 and the coil spring $o$ by virtue of its tension tends to rotate the shaft $c$ so as to urge the locking lug $e$ against the frame $f$ whereby the frame is moved inwardly until the spring bolt $n$ snugly engages one of the walls of its keeper $n'$ as indicated in Figure 10. In this manner vibration or chattering and consequent shocks are prevented.

I claim:

1. In a device of the character described, a plate, bearings carried by said plate and spaced horizontally and vertically, an obliquely extending shaft journaled in said bearings, said plate being slotted adjacent the ends of said shaft, a lug carried by one end of said shafts and operating in the adjacent slot and an operating lug carried by the opposite end of said shaft and having a stop engageable with said plate to limit the movement of the shaft in one direction and an operating toe extending above the plate and a coil spring associated with the shaft and urging it to rotate in one direction.

2. In a device of the character described, a plate, bearings carried by said plate and spaced horizontally and vertically, an obliquely extending shaft journaled in said bearings, said plate being slotted adjacent the ends of said shaft, a lug carried by one end of said shaft and operating in the adjacent slot, and an operating lug carried by the opposite end of said shaft and having an operating toe extending above the plate.

3. In combination with a vehicle body, a swinging frame mounted upon said body, a spring latch for securing said frame in closed position, and means for preventing chattering or vibration of said swinging frame including an obliquely extending shaft, a lug carried by one end of the shaft and engageable with the frame in the closed position thereof, an operating lug carried by the opposite end of the shaft and having an operating toe engageable with the frame during its movement from open to closed position and having a locking portion engageable with the frame in closed position, and a coil spring associated with the shaft and urging it to rotate in one direction.

GUSTAVE BAEHR.